United States Patent [19]

Yamada et al.

[11] 4,261,482

[45] Apr. 14, 1981

[54] SQUEEZE VESSEL

[75] Inventors: Muneki Yamada, Ebina; Takesi Sugimoto, Yokohama; Jinichi Yazaki, Tokyo, all of Japan

[73] Assignees: Toyo Seikan Kaisha Limited; Lion Hamigaki Kabushiki Kaisha, both of Tokyo, Japan

[21] Appl. No.: 56,226

[22] Filed: Jul. 10, 1979

[30] Foreign Application Priority Data

Jul. 12, 1978 [JP] Japan ................................. 53-83927

[51] Int. Cl.³ ...................... B65D 37/00; B65D 35/08; B32B 27/08
[52] U.S. Cl. .................................... 222/215; 222/107; 428/35; 428/36; 428/516
[58] Field of Search .................. 222/107, 215; 428/35, 428/36, 516

[56] References Cited

U.S. PATENT DOCUMENTS

| 3,178,065 | 4/1965 | Averswald | 222/107 |
|---|---|---|---|
| 3,282,729 | 11/1966 | Richardson et al. | 428/516 |
| 3,294,557 | 12/1966 | Mayer | 428/516 |
| 3,347,419 | 10/1967 | Brandt et al. | 222/107 |
| 3,505,143 | 4/1970 | Haas et al. | 222/107 |
| 3,560,325 | 2/1971 | Sogi et al. | 428/516 |
| 3,946,905 | 3/1976 | Cogliano | 222/107 |
| 3,958,721 | 5/1976 | Kushida et al. | 222/107 |
| 4,079,850 | 3/1978 | Suzuki et al. | 428/516 |
| 4,104,404 | 8/1978 | Bieler et al. | 428/516 |
| 4,139,665 | 2/1979 | Herrero | 222/107 |

*Primary Examiner*—William R. Dixon, Jr.
*Attorney, Agent, or Firm*—Sherman & Shalloway

[57] ABSTRACT

Disclosed is a squeeze vessel having a good combination of deformability, memory property and interlaminar peel resistance, suitable for squeezing out the content, and being excellent in content preserving property, flavor retaining property and appearance characteristics. This squeeze vessel comprises a laminate structure including at least one layer composed mainly of at least one member selected from the group consisting of ethylene-vinyl alcohol copolymers and polyamides, at least one layer composed mainly of an olefin resin having an elasticity of 900 to 9000 Kg/cm² and an adhesive layer interposed between said two layers, said adhesive layer comprising a modified olefin resin having an elasticity ($E_a$) lower than the elasticity ($E_b$) of said oxygen barrier resin but higher than the elasticity ($E_o$) of said olefin resin, wherein the thickness of the layer composed mainly of the olefin resin is larger than the sum of the thickness of said oxygen barrier resin layer and the thickness of said adhesive layer and in the layer composed mainly of the olefin resin the product of the elasticity ($E_o$, Kg/cm²) and the thickness ($t_o$, cm) is in the range of from 9 to 170 Kg/cm.

6 Claims, 9 Drawing Figures

SQUEEZE VESSEL

BACKGROUND OF THE INVENTION

1. Field of the Invention

This invention relates to a plastic squeeze vessel. More particularly, the invention relates to a plastic squeeze vessel composed of a plastic laminate having deformability and shape restoring property suitable for squeezing and high interlaminar peel strength.

Squeeze vessels composed of various flexible laminates have heretofore been proposed as squeeze tube vessels for highly viscous materials such as dental creams, cosmetics and foods and squeeze bottles for viscous foods such as ketchup, mayonnaise, jam and chocolate.

In general, these flexible laminates comprise an intermediate oxygen barrier layer composed of a saponified ethylene-vinyl acetate copolymer or nylon and layers of an olefin resin such as polyethylene laminated on both sides of the intermediate layer. In the process for forming tubes from these laminates, constituent layer sheets are lapped and bonded to form a cylinder and a screwed squeeze opening and a conical shoulder portion contiguous and connected to the screwed opening formed by injection molding of a resin are bonded to one end of the cylinder while the other end of the cylinder is closed by fusion bonding or the like.

In the formation of squeeze bottles, a multi-layer parison having the above-mentioned laminate structure is hollow-molded in a split mold to obtain a bottle.

These known squeeze vessels, however, are still insufficient in the combination of deformability, memory property of shape restoring property and interlaminar peel strength which are necessary for attaining a good squeezability.

For example, a plastic squeeze vessel is different from a squeeze vessel composed of an aluminum foil or a laminate of an aluminum foil and a plastic layer in the point that when a certain pressing deformation is given and it is then released, the original shape is restored because of too high a restoring property. Accordingly, when the vessel is sealed by a lid after the use and is stored again, a large quantity of air is sucked in the vessel and the content is deteriorated by oxygen in the vessel. Moreover, because of the excessively high restoring property, when the amount of the content left in the vessel becomes small, the content cannot be squeezed out unless the vessel wall is considerably pressed and deformed. Still further, since air is included in the vessel, at the time of pressing deformation, the content in an amount much larger than the amount to be used for one time is squeezed out or scattered singly or together with air, resulting in wasteful consumption of the content or contamination of a garment, a table or a table cloth.

In case of a squeeze vessel required to have a high transparency, by the pressing force applied to squeeze out the content or the repeated deformation given to the vessel, peeling is readily caused between the oxygen barrier layer and the olefin resin layer and as a result, the transparency is drastically degraded (that is, a so-called blanching phenomenon takes place), or the resistance to premeation of oxygen or water vapor is drastically lowered.

SUMMARY OF THE INVENTION

It is therefore a primary object of this invention to provide a plastic squeeze vessel having a multi-layer laminate structure, which has a good combination of deformability, memory property and interlaminar peel resistance, suitable for squeezing out the content and is excellent in content preserving property, flavor retaining property and appearance characteristics.

Another object of the present invention is to provide a squeeze vessel which has a deformability suitable for squeezing out the content smoothly and squeezing out all of the content effectively to the last and includes a wall having an appropriate memory property or shape restoring property such that when the pressing force for squeezing out the content is released, air is not excessively sucked in the vessel but the top end of the content in the vessel is stopped at a position slightly retreated from the vessel opening, in which an appropriate amount of the content can be squeezed out at every squeezing and interlaminar peeling is not caused even if the pressing force is repeatedly applied and the vessel is repeatedly deformed and in which deterioration of the content of reduction of the flavor of the content can be effectively prevented even if the vessel is used for a long period.

Still another object of the present invention is to provide a squeeze tube vessel excellent in the content preserving property, the flavor retaining property, the squeezability, the filling property and the appearance characteristics.

In accordance with the present invention, there is provided a squeeze vessel comprising a laminate structure including at least one layer composed mainly of at least one oxygen barrier resin selected from the group consisting of ethylene-vinyl alcohol copolymers and polyamides, at least one layer composed mainly of an olefin resin having an elastically of 900 to 9000 $Kg/cm^2$ and an adhesive layer interposed between said two layers, said adhesive layer comprising a modified olefin resin having an elasticity ($E_a$) lower than the elasticity ($E_b$) of said oxygen barrier resin but higher than the elasticity ($E_o$) of said olefin resin, wherein the thickness of the layer composed mainly of the olefin resin is larger than the sum of the thickness of said oxygen barrier resin layer and the thickness of said adhesive layer and in the layer composed mainly of the olefin resin, the product of the elasticity ($E_o$, $Kg/cm^2$) and the thickness ($t_o$, cm) is in the range of from 9 to 170 $Kg/cm$.

The squeeze vessel of the present invention is used in the form of a so-called squeeze tube or bottle or other similar modified form suitable for squeezing out the content.

DETAILED DESCRIPTION OF THE PREFERRED EMBODIMENTS

Figure 1:
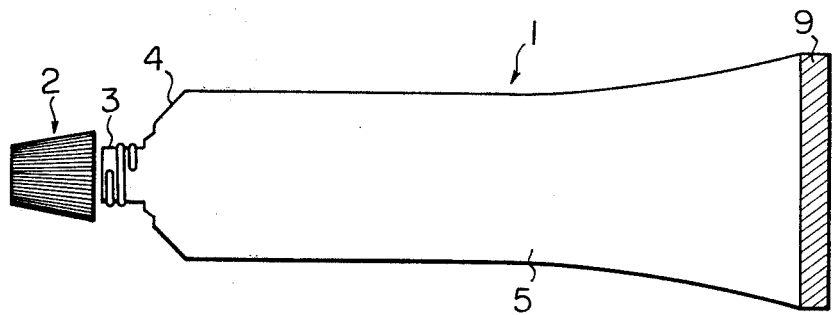
FIG. 1 is a perspective view illustrating one embodiment of the tube vessel of the present invention.
Figure 2:
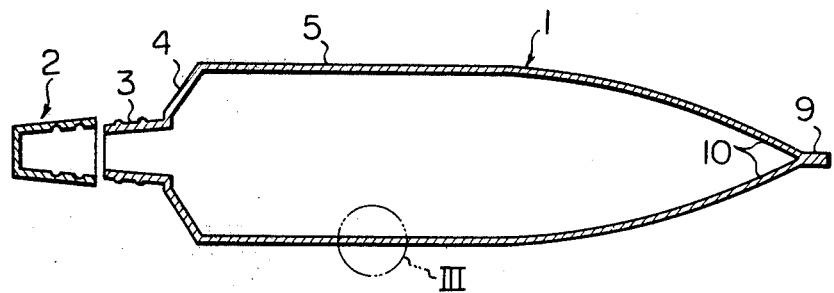
FIG. 2 is a sectional view illustrating the tube vessel shown in FIG. 1.
Figure 3:
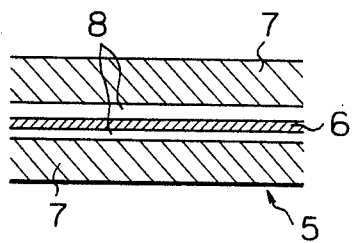
FIG. 3 is an enlarged view showing the section of the wall of a multi-layer parison.
Figure 4A:
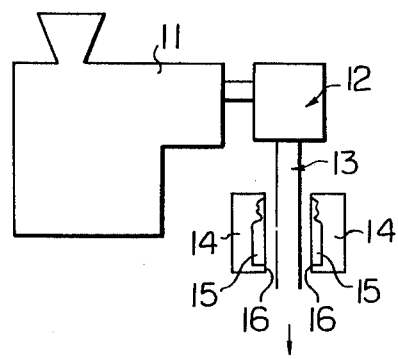
FIGS. 4-A, 4-B, 4-C, 4-D, 4-E and 4-F are views showing the steps of the process for the preparation of tube vessels according to the present invention.
Figure 4E:
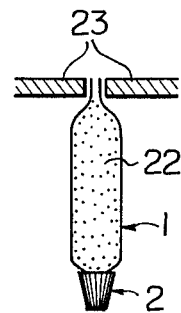
Figure 4B:
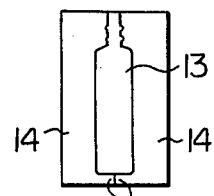
Figure 4C:
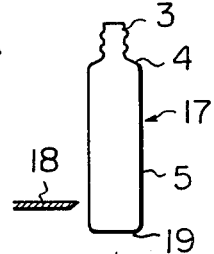
Figure 4F:
Figure 4D:
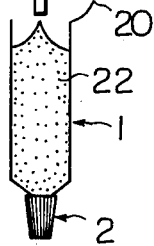

Referring to FIGS. 1, 2 and 3 illustrating one embodiment of the tube vessel of the present invention, the tube vessel comprises a tube proper 1 and a lid 2, and this tube proper has a screwed squeeze opening 3, a flexible conical shoulder portion 4 consecutive thereto and a flexible cylindrical portion 5 consecutive thereto, which are integrally formed from a multi-layer parison, described in detail hereinafter, by hollow molding.

Referring to FIG. 3 which is an enlarged view showing the section of the wall of the parison constituting these portions, a barrel wall 5 includes an oxygen barrier thermoplastic resin layer 6, an olefin resin layer 7 and an adhesive layer 8 which is interposed between said two layers 6 and 7.

Referring to FIGS. 1 and 2, the cylindrical barrel portion 5 has a cut end edge 9 and at this cut end edge 9, the confronting inner faces 10 of the barrel portion 5 are lapped and fusion-bonded to form a bottom portion.

As a suitable example of the resin of the oxygen barrier layer 6, there can be mentioned an ethylene-vinyl alcohol copolymer, especially one having a vinyl alcohol unit content of 40 to 85 mole %, particularly 50 to 80 mole %. Such ethylene-vinyl alcohol copolymer can be obtained by saponifying a copolymer of ethylene or a mixture comprising a major amount of ethylene and a minor amount of other olefin such as propylene with a vinyl ester of a lower fatty acid such as vinyl formate, vinyl acetate or vinyl propionate, to a saponification degree of at least 96%, especially at least 99%.

As another type of the oxygen barrier resin, there can be mentioned nylon resins, especially nylon 6, nylon 8, nylon 11, nylon 12, nylon 6-6, nylon 6-10, nylon 10-6 or nylon 6/nylon 6-6 copolymers.

These oxygen barrier resins may be used in the form of a so-called blend. For example, a blend of an ethylene-vinyl alcohol copolymer and a nylon resin and a blend composed mainly of an ethylene-vinyl alcohol copolymer and/or a nylon resin and containing other resin, for instance, polyethylene, an ethylene-vinyl acetate copolymer or an ionomer can be used so far as the oxygen permeation coefficient is lower than $5.5 \times 10^{-12}$ cc·cm/cm$^2$·sec·cmHg, especially lower than $4.5 \times 10^{-12}$ cc·cm/cm$^2$·sec·cmHg, as measured at a temperature of 37° C. and a relative humidity of 0%.

Any of known olefin resins can be used as the olefin resin of the layer 7 so far as the condition that the elasticity (Eo) should be in the range of 900 to 9000 Kg/cm$^2$, particularly 900 to 4000 Kg/cm$^2$ is satisfied. Namely, olefin resins having an elasticity within this range are selected from polyolefins such as low density polyethylene, medium density polyethylene, high density polyethylene, isotactic polypropylene, polybutene-1, poly-4-methylpentene-1 and an ethylene-propylene copolymer, copolymers composed mainly of olefins such as an ethylene-vinyl acetate copolymer, an ethylene-acrylic acid ester copolymer and an ionomer and blends of these polyolefins, and they are advantageously used as the olefin resin.

In order to improve the squeeze characteristics of the olefin resin layer, an elastomer such as polyisobutylene, butyl rubber, styrene-butadiene rubber or ethylene-propylene rubber may be incorporated into the olefin resin in a small amount, that is, 1 to 30 parts by weight per 100 parts by weight of the olefin resin.

In the present invention, in order to obtain especially preferred squeeze characteristics, an olefin resin having an elasticity of 900 to 4000 Kg/cm$^2$, especially low density polyethylene, an ethylene-vinyl acetate copolymer or an ionomer is advantageously used.

A coloring material such as a pigment or dye customarily used for an olefin resin may be used for the olefin resin layer 7. Since a dye ordinarily has a high diffusibility, a pigment is usually preferred. For example, there can be used Vat Orange, Aniline Black, titanium white, zinc sulfide, chrome yellow, Chrome Bar Million, cobalt blue, ultramarine, carbon black and an azo type pigment. These pigments may be used singly or in the form of a mixture of two or more of them. The content of the pigment is changed depending on the kind of the pigment used and the object of the use of the pigment, but from the viewpoints of the interlaminar bondability and other factors, it is important that the content of the pigment should be less than 1.0% by weight, especially less than 0.1% by weight.

The coloring material may be incorporated into the adhesive layer 8 described in detail hereinafter instead of the olefin resin layer 7. Furthermore, a coloring material layer may be laminated independently.

In the present invention, it is important that a modified olefin resin having an elasticity (Ea) lower than the elasticity (Eb) of the oxygen barrier resin but higher than the elasticity (Eo) of the olefin resin should be used for the interposed adhesive layer 8.

The olefin resin that is used in the present invention has a low elasticity because of an inherent chemical structure of the polymer, but the oxygen barrier resin has a considerably high elasticity because of strong hydrogen bonds owing to the presence of polar groups in the polymer. Accordingly, there is a considerable difference of the elasticity between the olefin resin layer and the oxygen barrier layer, and in case of a laminate which undergoes pressing or deformation repeatedly, such as a squeeze vessel, even if an adhesive layer is interposed between the two layers, interlaminar peeling is readily caused, and loss of clarity or drastic reduction of the gas barrier property is sometimes caused.

In accordance with the present invention, an adhesive layer of a modified olefin resin having an elasticity intermediate between the elasticity of the olefin resin layer and the elasticity of the oxygen barrier layer is interposed between the two resin layers, whereby a strong bonding capable of resisting repeated deformation such as mentioned above can be provided. This feature is quite surprising from the technical common sense that a resin having a low elasticity is rather preferred for the interposed adhesive layer.

Furthermore, if a modified olefin resin layer having the above-mentioned elasticity is interposed between the olefin resin layer and the oxygen barrier resin layer, as will be apparent from the results of Examples given hereinafter, a combination of the deformability and restoring property most suitable for squeezing can be obtained. Although the reason of this unexpected effect has not been completely elucidated, it is estimated that this effect is due to the fact that dynamic properties of the respective layers are well-balanced in the laminate used in the present invention.

In the present invention, it is especially preferred that the elasticity (Ea) of the modified resin that is used in the present invention be in the range represented by the following formula:

$$Eb - 10,000 > Ea > Eo + 100$$

In the present invention, any of products formed by incorporating known carbonyl group-containing ethylenically unsaturated monomers into main or side chains of olefin resins by known treatments such as graft copolymerization, block copolymerization, random polymerization and terminal treatment can be used as the modified olefin resin, so far as the foregoing requirements are satisfied.

As the carbonyl group-containing ethylenically unsaturated monomer, there can be used monomers having a carbonyl group

derived from a carboxylic acid, a carboxylic acid salt, a carboxylic anhydride, a carboxylic acid ester, a carboxylic acid amide or imide, an aldehyde or a ketone and monomers having a cyano group (—C≡N), a hydroxyl group, an ether group or an oxirane ring

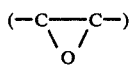

in combination with the carboxyl group. These monomers may be used singly or in the form of a mixture of two or more of them. Suitable examples of monomers are as follows:

(A) Ethylenically unsaturated carboxylic acids such as acrylic acid, methacrylic acid, maleic acid, fumaric acid, crotonic acid, itaconic acid, citraconic acid and 5-norbornene-2,3-dicarboxylic acid.

(B) Ethylenically unsaturated carboxylic anhydrides such as maleic anhydride, citraconic anhydride, 5-norbornene-2,3-dicarboxylic anhydride and tetrahydrophthalic anhydride.

(C) Ethylenically unsaturated esters such as ethyl acrylate, methyl methacrylate, 2-ethylhexyl acrylate, monoethyl maleate, diethyl maleate, vinyl acetate, vinyl propionate, propyl γ-hydroxymethacrylate, ethyl β-hydroxyacrylate, glycidyl methacrylate and β-N-ethylaminoethyl acrylate.

(D) Ethylenically unsaturated amides and imides such as acrylamide, methacrylamide and maleimide.

(e) Ethylenically unsaturated aldehydes and ketones such as acrolein, methacrolein, vinylmethyl ketone and vinylbutyl ketone.

In the present invention, among the foregoing monomers, ethylenically unsaturated carboxylic acids and ethylenically unsaturated carboxylic anhydrides are especially preferred. These monomers are used singly or in combination with other monomers for modification of olefin resins.

In order to obtain a high interlaminar bonding strength, such carboxyl group-containing monomer is bonded to the main or side chain of an olefin resin so that the carboxyl group concentration is 1 to 600 meq/100 g of the polymer and the degree of crystallization of the resulting modified olefin resin is at least 15%.

As the olefin, there can be mentioned, for example, ethylene, propylene, butene-1, pentene-1 and 4-methylpentene-1. These olefins are used singly or in the form of a mixture of two or more of them, so far as the above requirements are satisfied.

In order to modify an olefin resin so that the foregoing requirements are satisfied, for example, in case of the grafting treatment, it is necessary to select an olefin resin having a degree of crystallization of at least 15% as the starting olefin resin and conduct the grafting treatment under such conditions that the degree of crystallization of the olefin resin is not reduced below 15%. For this reason, high density polyethylene or isotactic polypropylene or a highly crystalline ethylenepropylene copolymer is preferably employed as the trunk polymer. Further, under such mold grafting conditions as will not cause any substantial reduction of the degree of crystallization, medium density polyethylene and low density polyethylene having a degree of crystallization higher than 15% can also be used.

The grafting treatment can be conducted under known conditions so far as the above requirements are satisfied. For example, when a trunk polymer composed of an olefin resin is contacted with a carboxyl group-containing ethylenically unsaturated monomer in the presence of a radical initiator or under application of radical initiating means, a modified olefin resin can easily be obtained. The trunk polymer may be contacted with the monomer in a homogeneous solution system, a solid-liquid or solid-gas heterogeneous system or a homogeneous melt system. As the radical initiator, there can be mentioned, for example, organic peroxides such as dicumyl peroxide, t-butyl hydroperoxide, dibenzoyl peroxide and dilauroyl peroxide and azonitriles such as azobisisobutyronitrile and azobisisopropionitrile. These initiators are used in known catalytic amounts. As the radical initiating means, there can be mentioned, for example, ionizing radiations such as X-rays, γ-rays and electron rays, ultraviolet rays, combinations of ultraviolet rays with sensitizers, and mechanical radical initiating means such as kneading (mastication) and ultrasonic vibration.

In case of reaction of the homogeneous solution system, the olefin resin, monomer and initiator are dissolved in an aromatic solvent such as toluene, xylene or tetralin, and the grafting reaction is carried out. The resulting modified olefin is recovered as a precipitate. In case of reaction of the heterogeneous system, a powder of the olefin resin is contacted with the monomer or a dilution of the monomer under ionizing radiations to effect grafting. In case of reaction of the homogeneous melt system, a blend of the olefin resin and monomer optionally with the initiator is melt-extruded by an extruder or kneader to form a modified olefin resin. In each case, the resulting modified olefin resin may be subjected to a purifying treatment such as washing or extraction so as to remove the unreacted monomer, the homopolymer or the residual initiator. Further, when the resulting modified olefin resin is recrystallized from an aromatic solvent such as mentioned above and the crystallization conditions are appropriately controlled, the particle size can be adjusted.

A modified olefin resin that is used in the present invention can easily be prepared in the foregoing manner.

In accordance with a preferred embodiment of the present invention, a modified olefin resin having a degree of crystallization of 40 to 95% and a carbonyl group concentration of 1 to 600 meq per 100 g of the polymer is used in combination with an olefin resin selected from group consisting of low density polyethylene, an ethylenevinyl acetate copolymer and an ionomer. According to this embodiment, though the moisture resistance of the olefin resin layer is poor, the moisture permeation resistance of the laminate structure as a whole can be remarkably improved and also the oxygen permeation resistance in an ordinary atmosphere can be highly improved.

In the present invention, the above-mentioned modified olefin resins may be used singly or in the form of a resin blend of two or more of them. Furthermore, a blend of such modified olefin resin with other crystalline olefin resin may be used. In these blends, the elasticity of the resin blend as a whole, the degree of crystallization and the carbonyl group content should be in the above-mentioned ranges.

These resin layers are co-melt-extruded in the form of a multi-layer parison and the parison is blow-molded to form a squeeze bottle. Further, a tube vessel is formed by heat-sealing the edge portion of the so formed bottle. Moreover, the resin layers are formed into a multi-layer film and the film is lap-bonded to form a tube vessel.

The arrangement of the layers in a multi-layer parison or sheet is preferably determined according to the intended use of the final product vessel or required physical properties. For example, when a non-aqueous content is packed in the vessel, a layer of a resin chemically inactive, such as polyolefin, need not be used as the innermost layer. However, when a food or the like is packed, it is preferred that a polyolefin which is considered safest from the viewpoint of sanitation be used for the innermost layer. Examples of suitable layer arrangements are described below. In the illustration, A stands for an oxygen barrier thermoplastic resin layer, B and B' stand for an olefin type thermoplastic resin layer and C stands for a modified olefin type adhesive layer.

(I) Three-Layer Structure:

$$B/C/A \quad (1)$$

(II) Four-Layer Structure:

$$B/B'/C/A \quad (2)$$

$$B/C/A/C \quad (3)$$

(III) Five-Layer Structure:

$$B/C/A/C/B \quad (4)$$

$$B/C/A/C/B' \quad (5)$$

$$(B+A+C)/C/A/C/(B+A+C) \quad (6)$$

(IV) Six-Layer Structure:

$$B/B'/C/A/C/B \quad (7)$$

$$B/(B+A+C)/C/A/C/B \quad (8)$$

(V) Seven-Layer Structure:

$$B/(B+A+C)/C/A/C/(B+A+C)/B \quad (9)$$

$$B/B'/C/A/C/B'/B \quad (10)$$

From the viewpoint of the squeeze characteristic, in the present invention, it is preferred the oxygen barrier layer (A) be disposed as an intermediate layer and the olefin resin layer (B) be disposed as outer and inner layers. In this case, another appropriate resin layer may be interposed between the two layers (A) and (B).

In the present invention, from the viewpoint of the squeeze characteristic, it is especially important that the thickness (to) of the above-mentioned layer composed mainly of the olefin resin should be larger than the sum (tb+ta) of the thickness (tb) of the oxygen barrier layer and the thickness (ta) of the adhesive layer and in this layer composed mainly of the olefin resin, the product of the elasticity (Eo) and the thickness (to) should be in the range of from 9 to 170 Kg/cm. When the sum (ta+tb) of the thickness of the oxygen barrier resin layer which has a high elasticity and the thickness of the adhesive layer is larger than the thickness (to) of the olefin resin layer, it is very difficult to impart an appropriate deformability and a sufficient restoring property to the laminate structure. According to the present invention, by satisfying the requirement of to/(ta+tb)>1, particularly to/(ta+tb)≧5, it is possible to impart to the laminate structure an appropriate deformability suitable for squeezing out the content smoothly and substantially completely and such a restoring property of the vessel wall as will not suck air excessively on release of the pressing force for squeezing but will stop the top end of the content at a position slightly retrated from the vessel opening. In other words, the content can always be squeezed out in an appropriate quantity at every pressing.

From the viewpoint of the resistance to permeation of oxygen, it is preferred that the requirement of 50≧to/(ta+tb) be satisfied.

Moreover, a value optimum for the squeeze characteristic is present for the product (to×Eo) of the elasticity (Eo) and the thickness (to) of the olefin resin layer. If the value of this product is larger than the upper limit of the above-mentioned range, it is difficult to attain a deformability sufficient to squeeze out the content smoothly and substantially completely to the last. Furthermore, on release of the pressing force, air is excessively sucked in and various troubles are caused. When the value of this product is smaller than the lower limit of the above-mentioned range, the restoring property is relatively reduced and it is sometimes difficult to stop the top end of the content at a position slightly retreated from the opening of the vessel.

In the present invention, it is preferred that the thickness of the wall of the final tube vessel be 0.17 to 1.0 mm, particularly 0.3 to 0.7 mm.

The outer wall surface of the tube vessel of the present invention may be printed, and in order to prevent printed letters or patterns from being removed, it is preferred that the printed outer surface be coated with a top coat point customarily used, such as an epoxy type paint, an acrylic type paint or an epoxy-vinyl type paint.

The process for the preparation of the tube vessel of the present invention will now be described by reference to FIGS. 4-A through 4-F. Extruders 11 in a number corresponding to the number of the kinds of resin layers constituting the multi-layer parison are used (only one extruder is shown in the drawing), and an oxygen barrier resin, a moisture-resistant resin and an adhesive resin are co-melt-extruded through a multi-ply die 12 to form a multi-layer parison 13 (see FIG. 4-A).

A pair of split molds 14 are disposed along the advance direction of this multi-layer parison 13. The split molds 14 comprise a cavity 15 partitioned by inner walls corresponding to a screwed squeeze opening, a conical shoulder portion and a cylindrical barrel portion of the final tube vessel and a base insert 16 for pinching off the parison 13.

Referring to FIG. 4-B illustrating the blow molding step, the multi-layer parison 13 extruded from the die 12 is gripped by the split molds 14 and the lower end portion of the parison 13 is pinched off by the base insert 16, and simultaneously, a fluid such as air, nitrogen or water vapor is blown into the parison 13 and the parison 13 is blow-molded into a flexible bottle 17 (see FIG. 4-C) comprising a screwed squeeze opening, a conical shoulder portion, a cylindrical barrel portion and a bottom portion consecutive thereto.

At the trimming step shown in FIG. 4-C, the so formed flexible bottle 17 is cut at the end edge of the barrel portion by means of an appropriate cutter 18 to cut off the bottom portion 19 from the end edge of the barrel portion.

At the subsequent filling step shown in FIG. 4-D, a lid 2 is attached to the screwed opening of the so formed tube proper 1 and the tube proper 1 is turned upside down, and a viscous liquid content 22 is filled in the tube proper 1 through the end edge 20 of the tube proper 1 from a filling nozzle.

At the subsequent fusion bonding step shown in FIG. 4-E, the inner atmosphere (air or the like) of the tube proper 1 in which the content 22 has been filled is substantially excluded by pressing or the like according to need and while the end edge 20 of the tube proper 1 is being gripped by a heat-fusing mechanism such as a heat seal bar, the confronting inner faces are lapped and fusion-bonded to form a tube vessel having a bottom portion formed by the lap fusion bonding, as shown in FIG. 4-F.

In the present invention, melt extrusion for formation of a multi-layer parison can be carried out at a temperature higher than the melting points of the resins and lower than the decomposition points thereof, particularly 185° to 230° C., under known conditions.

Hollow molding of the multi-layer parison into a bottle can be carried out under known conditions while controlling the unit amount so that a flexibility suitable for squeezing of the content is given to the barrel portion and conical shoulder portion of the resulting bottle. For example, hollow molding for formation of a flexible bottle may be carried out by using a rotary or intermittent hollow molding machine.

Lap fusion bonding of the inner faces of the end edge of the opening of the vessel may be carried out by using not only a heat seal bar but also other optional mechanism such as a high frequency fusion bonding mechanism or an ultrasonic fusion bonding mechanism.

It will readily be understood by those skilled in the art that a squeeze bottle can be formed by flow molding according to procedures similar to those described above.

The present invention will now be described in detail by reference to the following Examples that by no means limit the scope of the invention.

EXAMPLE 1

An ethylene-vinyl alcohol copolymer (A) having an ethylene content of 30 mole %, a vinyl alcohol content of 69.7 mole % and a vinyl acetate content of 0.3 mole % and an elasticity of $3.5 \times 10^4$ Kg/cm² as measured according to the method of ASTM D-638 was used for the oxygen barrier resin layer, and a low density polyethylene (B) having a melt index of 0.5 g/10 min, a density of 0.91 g/cm³ (as measured at 20° C.) and an elasticity of $1.2 \times 10^3$ Kg/cm² as measured according to the above-mentioned method, an ethylene-vinyl acetate copolymer (C) having a melt index of 0.5 g/10 min, a density of 0.92 g/cm³ (as measured at 20° C.) an elasticity of $7.0 \times 10^2$ Kg/cm² as measured according to the above method and a vinyl acetate content of 5% by weight, a medium density polyethylene (D) having a melt index of 0.4 g/10 min, a density of 0.93 g/cm³ (as measured at 20° C.) and an elasticity of $3.5 \times 10^3$ Kg/cm² as measured according to the above method, a high density polyethylene (E) having a melt index of 0.3 g/10 min, a density of 0.95 g/cm³ (as measured at 20° C.) and an elasticity of $9.8 \times 10^3$ Kg/cm² as measured according to the above method, an ethylene-propylene copolymer (F) having a melt index of 1.4 g/10 min, a density of 0.90 g/cm³ (as measured at 20° C.), an ethylene content of 11 mole % and an elasticity of $7.8 \times 10^3$ Kg/cm² as measured according to the above method or a polypropylene (G) having a melt index of 0.7 g/10 min, a density of 0.91 g/cm³ (as measured at 20° C.) and an elasticity of $9.1 \times 10^3$ Kg/cm² as measured according to the above method was used as the olefin resin for inner and outer resin layers. An acid-modified high density polyethylene (H) (H31B manufactured and sold by Mitsubishi Petrochemical) having a density of 0.932 g/cm² (as measured at 20° C.) and an elasticity of $9.0 \times 10^3$ Kg/cm² as measured according to the above method was used for the adhesive layer to be interposed between the oxygen barrier resin layer and the olefin resin layer. These 5-layer vessels having dimensions, laminate layer structure and thickness ratio of respective layers shown in Table 1 were prepared from these resins by using a molding apparatus described below.

A molten multi-layer parison having a layer structure shown in Table 2 was prepared by using a multi-layer extruder comprising an extruder for an oxygen barrier resin layer including a screw having a diameter of 40 mm and an effective length of 800 mm, an extruder for an adhesive layer including a screw having a diameter of 35 mm and an effective length of 700 mm and an adapter having a two-branched melt channel, an extruder for outer and inner olefin resin layers including a screw having a diameter of 65 mm and an effective length of 700 mm and an adapter having a diameter of 65 mm and an effective length of 700 mm and an adapter having a two-branched melt channel. The so formed parison was gripped between split molds cooled to 10° C. and hollow-molded under a blowing pressure of 6 Kg/cm² to form a multi-layer tube vessel having a capacity of 120 g.

The layer structure and results of tests made on the interlaminar strength, squeeze property and easiness in squeezing with respect to the so obtained tube are shown in Table 1. As will readily be understood from the test results shown in Table 1, tube samples Nos. 1, 3, 4, 5, 8 and 11 satisfying the requirements of the present invention were excellent as the squeeze tube, and tube samples Nos. and 4 were especially excellent in the practical properties required of a squeeze tube.

TABLE 1

| Tube Sample No. | Resin or Inner and Outer Layers | Thickness[1] of Tube (mm) | Thickness Ratio (inner and outer layers/adhesive layers/barrier layer) | Elasticity[2] × Thickness (Kg/cm)(Inner and Outer layers) | Inter[3] laminar Peel Strength | Squeeze Characteristic [4] | Easiness in Squeezing [5] |
|---|---|---|---|---|---|---|---|
| 1 | B | 0.45 | 10/0.6/1 | 54 | O | 96 | ◉ |
| 2 | B | 2.0 | 44/0.6/1 | 240 | X | 70 | X |
| 3 | B | 0.18 | 4/0.6/1 | 21.6 | O | 98 | O |
| 4 | C | 0.45 | 10/0.6/1 | 42.8 | O | 97 | ◉ |
| 5 | D | 0.25 | 5.6/0.6/1 | 87.5 | O | 94 | O |
| 6 | E | 0.10 | 2.2/0.6/1 | 90 | X | 87 | X |
| 7 | E | 0.20 | 4.4/0.6/1 | 180 | X | 85 | X |
| 8 | F | 0.18 | 4/0.6/1 | 160 | O | 93 | O |
| 9 | F | 0.20 | 4.4/0.6/1 | 178 | X | 91 | X |
| 10 | G | 0.30 | 3.3/0.6/1 | 225 | X | 89 | X |
| 11 | G | 0.20 | 2.2/0.6/1 | 138 | O | 90 | O |

Note

[1] The average thickness of the olefin resin outer and inner layers of the barrel portion exclusive of the neck of the tube.

[2] The product of the average thickness and elasticity of the outer and inner olefin resin layers of the barrel portion exclusive neck of the tube.

[3] The central part of the barrel portion was bent by 180° in a direction rectangular to the direction connecting the neck of the tube to the bottom of the tube 100 times. The case where blanching and interlaminar peeling took place is indicated by mark X and the case where such undesirable phenomenon did not take place is indicated by mark O.

[4] The cap was removed from a tube filled with cleansing cream as a content and the tube was horizontally placed, and a flat plate was pressed to the tube from the bottom to the neck to squeeze out the content. The ratio (%) of the amount squeezed out to the total filled amount is shown.

[5] Content-filled tubes (cleansing cream-filled tubes) were treated by a panel of 20 women in the same manner as they actually used cleansing cream, and easiness of squeezing of the content [deformability and restoring property (delayed elasticity) and prevention of abrupt squeezing] was examined. Mark ◉ indicates the case where at least 18 women answered that the tube was excellent in easiness in squeezing, mark O indicates the case where 10 to 17 women answered that the tube was excellent in easiness in squeezing, and mark X indicates that less than 10 women answered that the tube was excellent in easiness in squeezing.

EXAMPLE 2

The same ethylene-vinyl alcohol copolymer (A) as described in Example 1 was used as the oxygen barrier layer, and the same low density polyethylene (B) or ethylene-vinyl acetate copolymer (C) as described in Example 1 was used as the olefin resin for outer and inner layers. The same acid-modified high density polyethylene (H) as described in Example 1, a maleic anhydride-modified ethylene-vinyl acetate copolymer (I) having a density of 0.94 g/cm³ (as measured at 20° C.), an elasticity of $9.5 \times 10^2$ Kg/cm² as measured according to the above-mentioned method and a vinyl acetate content of 13% by weight, a maleic anhydride-modified ethylene-propylene copolymer (J) having a density of 0.89 g/cm³ and an elasticity of $8.9 \times 10^3$ Kg/cm² as measured according to the above-mentioned method, or a resin (K) having an elasticity of $3.6 \times 10^4$ Kg/cm² as measured according to the above-mentioned method and obtained by modifying an ethylene-vinyl alcohol copolymer having an ethylene content of 30 mole %, a vinyl alcohol content of 69.7 mole % and a vinyl acetate content of 0.3 mole % with maleic anhydride to a degree of modification of 0.8% was used as the resin for the adhesive layer to be interposed between the oxygen barrier layer and the olefin resin layer. By using these resins, a multi-layer tube vessel having a capacity of 100 cc was prepared by the same molding apparatus and method as described in Example 4.

The laminate layer structure, thickness ratio and functional properties at the time of the use of the so prepared tube are shown in Table 2.

As is apparent from data shown in Table 2, tube samples Nos. 1, 5, 9, 10, 11 and 12, in which the requirement of the present invention that the elasticity of the interposed adhesive layer is lower than the elasticity of the oxygen barrier layer but higher than the elasticity of the olefin resin was satisfied, were excellent in the functional properties and interlaminar peel strength.

TABLE 2

| Tube Sample No. | Laminate Layer Structure | | Layer Thickness (mm)[1] | | | Functional[2] Properties | Interlaminar[3] Peel Strength |
|---|---|---|---|---|---|---|---|
| | Inner and Outer layers | Adhesive Later | Inner and Outer layers | Adhesive layer | Oxygen barrier layer | | |
| 1 | B | H | 0.39 | 0.02 | 0.04 | ◉ | O |
| 2 | B | I | 0.39 | 0.02 | 0.04 | X | O |
| 3 | B | I | 0.31 | 0.1 | 0.04 | X | X |
| 4 | B | I | 0.40 | 0.01 | 0.04 | X | O |
| 5 | B | J | 0.39 | 0.02 | 0.04 | O | O |
| 6 | B | K | 0.40 | 0.01 | 0.04 | X | O |
| 7 | B | K | 0.402 | 0.008 | 0.04 | X | X |
| 8 | B | K | 0.39 | 0.02 | 0.04 | X | X |
| 9 | C | H | 0.41 | 0.02 | 0.03 | ◉ | O |
| 10 | C | I | 0.41 | 0.02 | 0.03 | O | O |
| 11 | C | I | 0.39 | 0.03 | 0.03 | O | O |
| 12 | C | J | 0.40 | 0.02 | 0.03 | O | O |

TABLE 2-continued

| Tube Sample No. | Laminate Layer Structure | | Layer Thickness (mm)[1] | | | Functional[2] Properties | Interlaminar[3] Peel Strength |
|---|---|---|---|---|---|---|---|
| | Inner and Outer layers | Adhesive Later | Inner and Outer layers | Adhesive layer | Oxygen barrier layer | | |
| 13 | C | K | 0.41 | 0.01 | 0.03 | X | O |

Note
[1] The average thickness of each layer of the barrel portion exclusive of the neck of the tube.
[2] The functional properties were evaluated according to the method for determination of easiness in the filling operation, described in Table 1 of Example 1.
[3] The peel strength was determined according to the same method as described in Table 1 of Example 1.

EXAMPLE 3

A caprolactam/hexamethylene diammonium adipate resin (L) having a caprolactam concentration of 91 mole % and an elasticity of $3.0 \times 10^4$ Kg/cm$^2$ measured according to the above method was used for the oxygen barrier resin layer, and the same low density polyethylene (B) as used in Example 1 was used as the olefin resin of outer and inner layers. The same acid-modified high density polyethylene (H) as used in Example 1 or the same maleic anhydride-modified ethylene-vinyl acetate copolymer (I) as used in Example 3 was used for the interposed adhesive layer. By using these resins, a tube vessel having the same shape and thickness as described in Example 1 and having laminate layer structure and thickness ratio shown in Table 3 was prepared by the same molding apparatus and molding method as described in Example 1. With respect to two kinds of tubes vessels prepared according to the above procedures, the interlaminar peel strength was evaluated according to the method described in Table 1 of Example 1, and a specimen having a width of 1.0 cm and a length of 5.0 cm was cut from the sample in a direction connecting the neck to the bottom of the tube and the peel strength (T-peel strength) was measured at a peeling speed of 100 mm/min, an ambient temperature of 20° C. and a relative humidity of 60%. The obtained results are shown in Table 3.

TABLE 3

| Tube Sample No. | Interposed Adhesive Layer | Thickness Ratio (inner and outer layers/interposed adhesive layer/ barrier layer) | Peel Strength (Kg/cm width) (1) | Interlaminar Peel Strength (2) |
|---|---|---|---|---|
| 1 | H | 8/0.6/1 | 1.2 ± 0.3 | O |
| 2 | I | 8/0.6/1 | 1.4 ± 0.2 | X |

Note
[1] The peeling test was conducted 20 times either between (the outer layer and interposed adhesive layer) and the barrier layer or between (the inner layer and interposed adhesive layer) and the barrier layer, and the peel strength was expressed by a mean value of the obtained values.
[2] The interlaminar peel strength test described in Table 1 of Example 1 was carried out on 100 samples of each tube. The tube in which the number of samples where interlaminar peeling and blanching took place was smaller was indicated by mark O and the tube in which the number of samples where interlaminar peeling and blanching took place was larger was indicated by mark X.

As is apparent from the results shown in Table 3, the requirement specified in the present invention is significant for the practical resistance to interlaminar peeling, though the value of the interlaminar peel strength of the tube sample No. 2 is rather higher than that of the tube sample No. 1.

What we claim is:

1. A squeeze vessel comprising a co-melt extruded laminate structure including at least one first layer composed of at least one oxygen barrier resin selected from the group consisting of ethylene-vinyl alcohol copolymers and polyamides, at least one second layer composed of an olefin resin having an elasticity ($E_o$) of 900 to 9000 Kg/cm$^2$ and an adhesive layer interposed between said two layers, said adhesive layer interposed between said adhesive layer comprising an acid-modified olefin resin having a degree of crystallization of 40 to 95%, a carboxyl group concentration of 1 to 600 meq per 100 g of the polymer, and an elasticity (Ea) lower than the elasticity (Eb) of said oxygen barrier resin but higher than the elasticity (Eo) of said olefin resin, wherein the thickness of the layer composed mainly of the olefin resin is larger than the sum of the thickness of said oxygen barrier resin layer and the thickness of said adhesive layer and in the layer composed mainly of the olefin resin the product of the elasticity (Eo, Kg/cm$^2$) and the thickness (to,cm) is in the range of from 9 to 170 Kg/cm.

2. A squeeze vessel as set forth in claim 1 wherein the olefin resin layer is composed of an olefin resin having an elasticity (Eo) of 900 to 4000 Kg/cm$^2$, the oxygen barrier resin layer is composed of an ethylene-vinyl alcohol copolymer having a vinyl alcohol unit content of 40 to 85 mole % and the modified olefin resin constituting the adhesive layer has an elasticity (Ea) satisfying the following requirement:

$$Eb - 10,000 \geq Ea \geq Eo + 100$$

wherein Eb stands for the elasticity of the oxygen barrier layer.

3. A squeeze vessel as set forth in claim 1 or 2 wherein said olefin resin is a low density polyethylene, an ethylene-vinyl acetate copolymer or an ionomer.

4. A squeeze vessel as set forth in claim 1 or 2 which is in the form of a squeeze tube.

5. A squeeze vessel as set forth in claim 1 or 2 which is in the form of a squeeze bottle.

6. A squeeze vessel as set forth in claim 5 wherein said laminate structure comprises a second layer and an interposed adhesive layer bonded to the inner and outer surfaces of said first layer.

* * * * *